United States Patent [19]
Papak

[11] Patent Number: 4,638,853
[45] Date of Patent: Jan. 27, 1987

[54] APPARATUS FOR CONDITIONING AND CONTROLLING THE TEMPERATURE OF ROOMS IN A BUILDING

[75] Inventor: Viktor Papak, Aachen, Fed. Rep. of Germany

[73] Assignee: Josef Gartner & Co., Donau, Fed. Rep. of Germany

[21] Appl. No.: 634,298

[22] Filed: Jul. 25, 1984

[30] Foreign Application Priority Data

Jul. 29, 1983 [DE] Fed. Rep. of Germany ....... 3327459
Aug. 23, 1983 [DE] Fed. Rep. of Germany ....... 3330394

[51] Int. Cl.$^4$ .............................................. F24F 3/06
[52] U.S. Cl. ...................................... 165/50; 98/31.6; 98/88.1; 237/56
[58] Field of Search ................. 98/31, 31.6, 40.19, 98/88.1; 165/50; 237/46, 56

[56] References Cited

U.S. PATENT DOCUMENTS

| | | | |
|---|---|---|---|
| 2,901,226 | 8/1959 | Modine | 98/31.6 X |
| 3,074,477 | 1/1963 | Whalen | 165/50 X |
| 3,166,120 | 1/1965 | Butterfield et al. | 165/50 X |
| 3,171,471 | 3/1965 | Blum | 165/50 X |
| 3,425,485 | 2/1969 | Newton | 165/50 X |
| 3,982,475 | 9/1976 | Wild | 98/31 |
| 4,103,598 | 8/1978 | Cooper | 98/31 |
| 4,203,487 | 5/1980 | Gartner | 98/31 X |

FOREIGN PATENT DOCUMENTS 2020643 11/1971 Fed. Rep. of Germany .......... 98/31

Primary Examiner—Harold Joyce
Attorney, Agent, or Firm—Jerome P. Bloom

[57] ABSTRACT

In order in a facade comprising hollow uprights and hollow upper and lower transverse crossbars to be able to dispense with an expensive air-conditioning installation, a cross-stream blower is arranged under a railing crossbar. Over the cross-stream blower there is either provided a star ribbed pipe or the railing crossbar is constructed in several parts and provided with laminations the function of which is to serve in the pre-cooling or pre-heating of air drawn from a room of the building by the cross-stream blower, the pre-cooling or pre-heating taking place as the air is discharged from the blower and before it is sent back into the room. Pre-heated or pre-cooled air may be returned to the room by way of the railing crossbar, by way of and from the hollow uprights or by way of and from the upper transverse crossbar. A filter provided in advance of the cross-stream blower inhibits the passage of any health-hazardous dust or bacteria from reaching the blower or being transmitted back into the room.

28 Claims, 16 Drawing Figures

APPARATUS FOR CONDITIONING AND CONTROLLING THE TEMPERATURE OF ROOMS IN A BUILDING

BACKGROUND OF THE INVENTION

This invention relates to improvements in devices and systems for conditioning and controlling the temperature of rooms in a building with facade walls which comprise a framework of uprights and crossbars, on which facade elements and window areas are arranged substantially free of heat bridges, the uprights and crossbars forming a pipe frame register within which there is applied, selectively, a stream of hot water or cooling water, as needs require.

As best as applicant can determine, the prior art is represented by German Pat. No. 26 21 186. If for a building with such a facade there is no additional air conditioning provided and the fresh air feed occurs especially by way of windows to be opened, the achievement and maintenance of a comfortable room climate is problematic. In such case the window ventilation in summer brings the warm outside air into the room and in the winter it brings in the cold outside air. As will be obvious, the air so introduced must be re-cooled and reheated, respectively. If, further, no outside sun protection is provided on such facades and interior blind protection is all that is available, with extreme outside temperatures in the summer months the room temperature can rise to such a level as to make its climate uncomfortable. Accordingly the cooling performance of such an integrated facade is not satisfactory in the summer months since it is only about half as efficient as required. As a consequence, auxiliary measures are required to lower room temperature on hot days and raise it on very cold days in order to increase the comfort level therein.

Underlying the invention is the basic problem of creating a device, apparatus and a system by means of which the conditioning and controlling of the temperature of rooms in a building with an integrated facade is made possible without the necessity of use of an expensive air conditioning installation.

SUMMARY OF THE INVENTION

According to the present invention the solution of the problem posed in the prior art is achieved by arranging a cross-stream blower in the railing zone of the window areas and providing means whereby room air is drawn in by the blower and then given off by the blower back to the room, in the process of which there is a forced condition of room air past an element heated the temperature of which is being conditioned by a cooling or heating medium, as a result of which the room air is subjected to cooling or heating by means of a heat exchange. Since it is only the air from the room that is subjected to this conditioning, there occurs a relatively rapid temperature adjustment of the air in the room to which the system and apparatus is applied.

To achieve the rapid adjustment of the temperature of the room air as above described there is preferably arranged over the cross-stream blower, in the path of air discharged therefrom, a star ribbed pipe through which is passed a cooling or heating medium, as circumstances require. As an alternative, a railing crossbar may be provided over the blower which includes means for the passage therethrough of a cooling or heating medium. Such a railing crossbar is preferably constructed in three parts, in which arrangement two parts are provided with laminations and passage openings. The laminations are arranged to intermesh in the manner of a comb and the passage openings may be constructed as bores or elongated slits. Through the arrangement of a star ribbed pipe or of a multi-part transverse crossbar provided with laminations and passage openings there can take place, in consequence of the large surface area that is so provided, an effective heat transition from the air to the medium flowing through the pipe or crossbar or vice versa. In this manner the conditioning and controlling of the temperature of the room air is achieved.

The air conducted through the cross-stream blower can be delivered therefrom to the interior of the room being serviced through slits in the railing crossbars, in the facade uprights or in the upper transverse crossbar of the facade sections. The guidance of the air delivered to the room is by way of channels formed in the facade elements. At the connecting places of the transverse crossbars and facade uprights are hollows through which air can be conducted.

In order not to generate any circulation of dust or bacteria in the room serviced, in a further development of the invention a filter is arranged in the intake zone for the room air which is in front of the cross-stream blower. The air circulation amount per cross-stream blower may lie in the range of 50 to 100 $m^3$ per hour. Further, for each facade element, which consists, for example, of a window area provided between two facade posts in a panel, there can be provided a regulating valve, a temperature sensor with regulator and a switch-over relay for switching over from warm to cold water and vice versa.

According to another form of execution it can be provided in the interior of the building that there is arranged on uprights and crossbars a pipe frame register and that in this pipe frame register are the passages for conducting water and air in accordance with the invention. Preferably the vertical profiles of the pipe frame register run from the upper edge of the floor to the lower edge of the ceiling of a room, in which arrangement the ceiling can also be suspended. This pipe frame register, therefore, is not a story-high. The spacing of the vertical parts of the register and the length of the horizontal parts are established as required.

According to a preferred form of execution thereof the pipe frame register can be screwed together with the facade elements or in the alternative the facade elements can be clamped thereon. For this purpose the facade elements can be provided with shanks pressed or screwed thereon. Through this arrangement the pipe frame register can be disassembled at any time. This is especially advantageous where there is a requirement for the repair of leaks. Furthermore it is possible to provide facades on hand with such a pipe frame register having an integrated cross-stream fan for use in the heating, cooling and ventilating of the area to be serviced.

Examples of execution of the invention may be seen and are herein explained with the aid of the accompanying drawings wherein.

DESCRIPTION OF THE PREFERRED EMBODIMENTS OF THE INVENTION WITH REFERENCE TO THE ACCOMPANYING DRAWINGS

Figure 1:
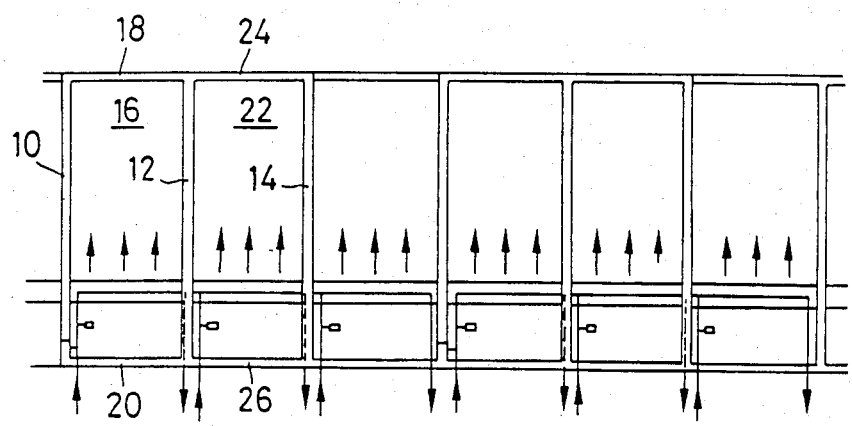
FIG. 1 is a schematic showing of a front view of several adjacently arranged facade elements of a single story of a building.

The function fields of a facade shown in FIG. 1 consist of sections spaced from one another by hollow uprights 10, 12 and 14. The first facade surface 16 is bounded by the hollow uprights 10 and 12 and the transverse crossbars 18 and 20. The second facade surface 22 is bounded by the hollow uprights 12 and 14 and the transverse crossbars 24 and 26.

Figure 2:
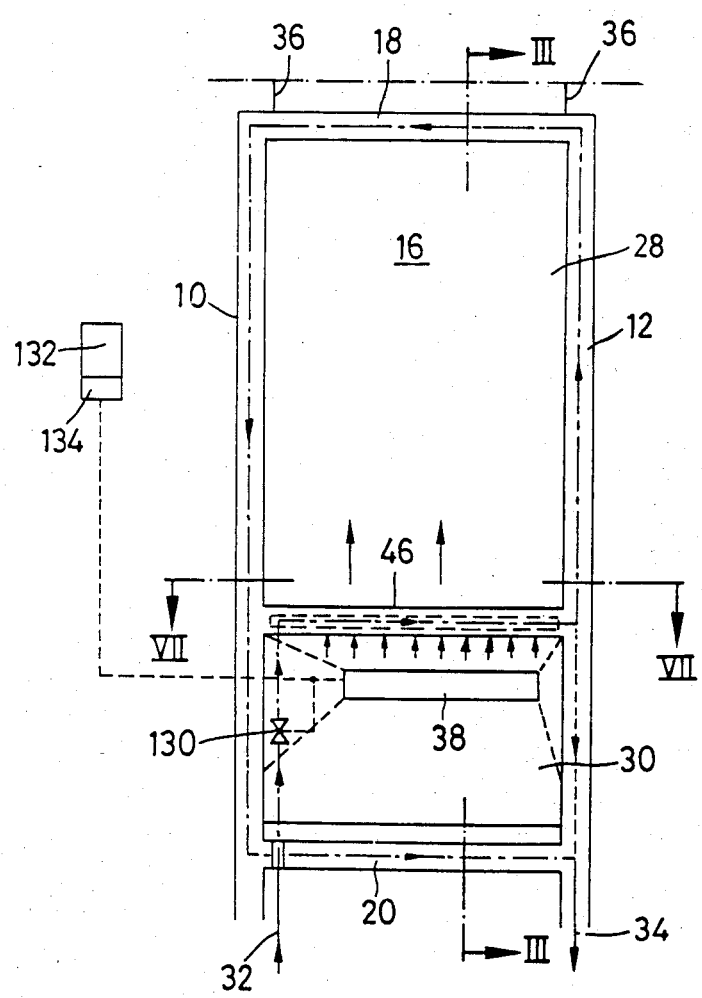
FIG. 2 shows an enlarged view of a facade element.

FIG. 2 shows the facade surface 16 on an enlarged scale. The hollow uprights 10 and 12 and the hollow crossbars 18 and 20, free of cold or heat bridges, are assembled into a pipe frame register and receive casement windows 28 which are to be opened, which present, for example, an insulating glazing, and railing panels 30. Channels are provided in the hollow uprights 10, 12 and the hollow crossbars 18, 20 through which there flows in fixed sequence a volume stream of hot water or a volume stream of cooling water, supplied thereto by way of a forward flow line 32 and delivered therefrom by way of a return line 34. The flow of this water through the uprights and crossbars accomplishes the heating or cooling of the building interior. A ventilating device 36 can be arranged on the upper transverse crossbar 18. The heat performance of such a pipe frame register of a facade field suffices to cover the entire transmission losses inclusive of the ventilating heat requirement of the built-in rotary or tilting casement windows. The cooling performance of such a facade does not suffice, however, to provide a comfortable room climate in the interior of the building during the summer months.

Figure 3:
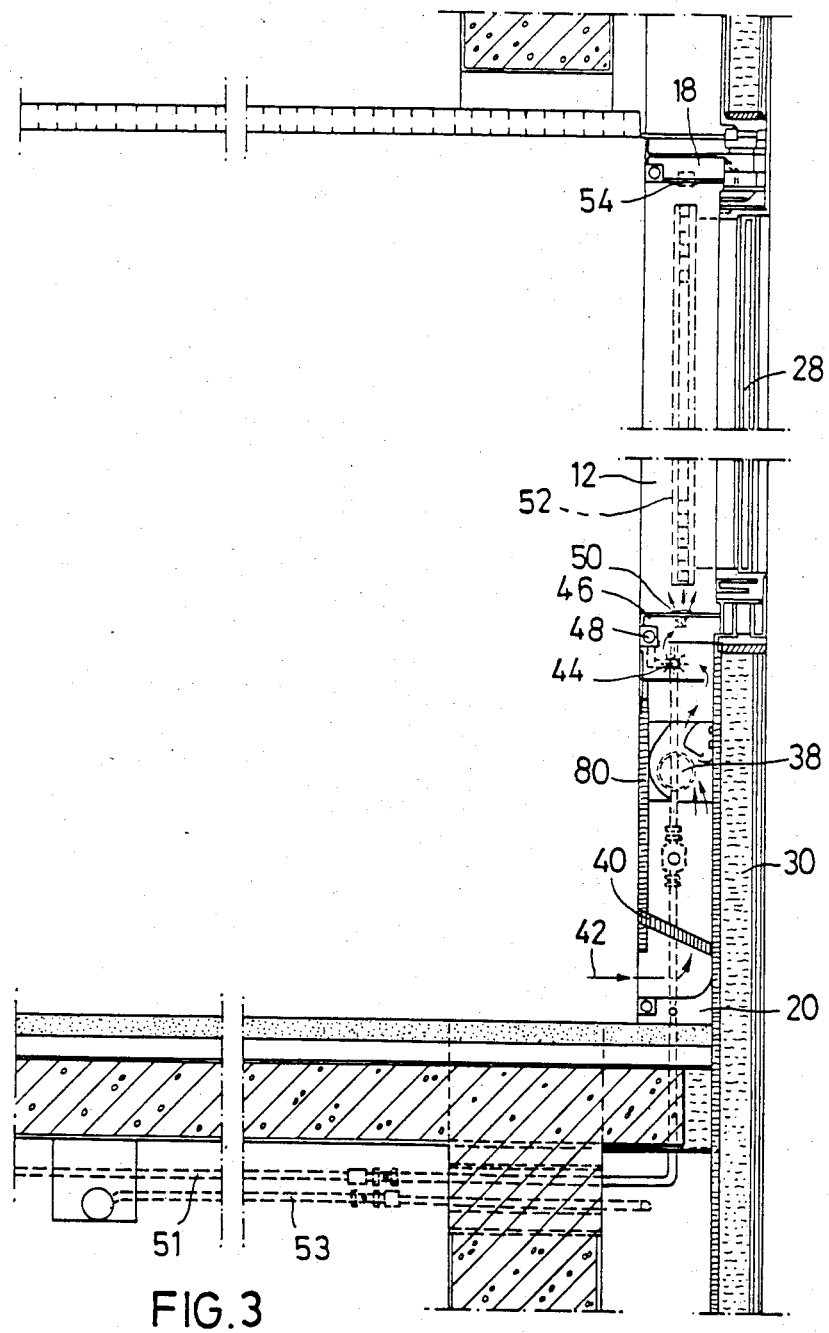
FIG. 3 shows a vertical section through a story of a building taken on line III—III of FIG. 2.

In order to improve the comfort and to lower the room temperature on hot days and raise it on very cold days, per the present invention the cross-stream blower 38 is provided in the railing zone of each facade element of such a facade construction. As is to be seen especially from FIG. 3, under the cross-stream blower 38 there is arranged a filter 40, through which room air is drawn, as indicated by the arrow 42, from the lower zone of the frame, by the blower. This room air received by the blower is then directed upwardly therefrom to pass about an element which is traversed by a heating or cooling medium. In the embodiment of the invention shown in FIG. 3 the element traversed by a heating or cooling medium is a star ribbed pipe 44, which extends underneath a railing crossbar 46. The star ribbed pipe 44 is traversed in summer, for example, by cooled water. The railing crossbar 46 has formed therein a channel 48 through which likewise cooling water can flow. In the winter, with cool room temperatures, instead of the cooling water, heated water is caused to flow through the ribbed pipe and the channel 48 of the railing crossbar. A forward flow line 51 and a return line 53 is shown in FIG. 3 to provide for the cooling or heating water to flow to, through and from the star ribbed pipe 44 and the channel 48.

Figure 4:
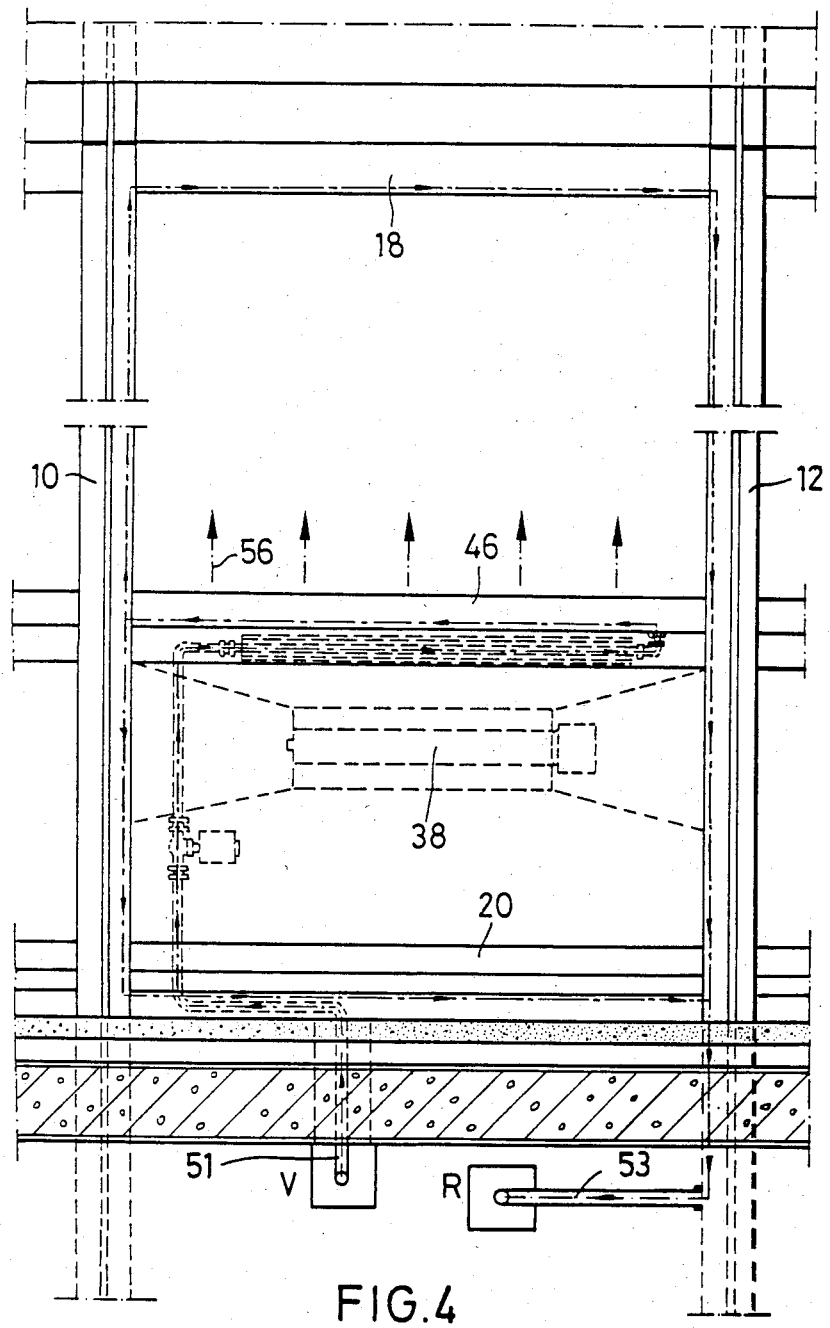
FIGS. 4-6 show various forms of execution of the structure for the conduction of the air the temperature of which is conditioned and controlled.
Figure 5:
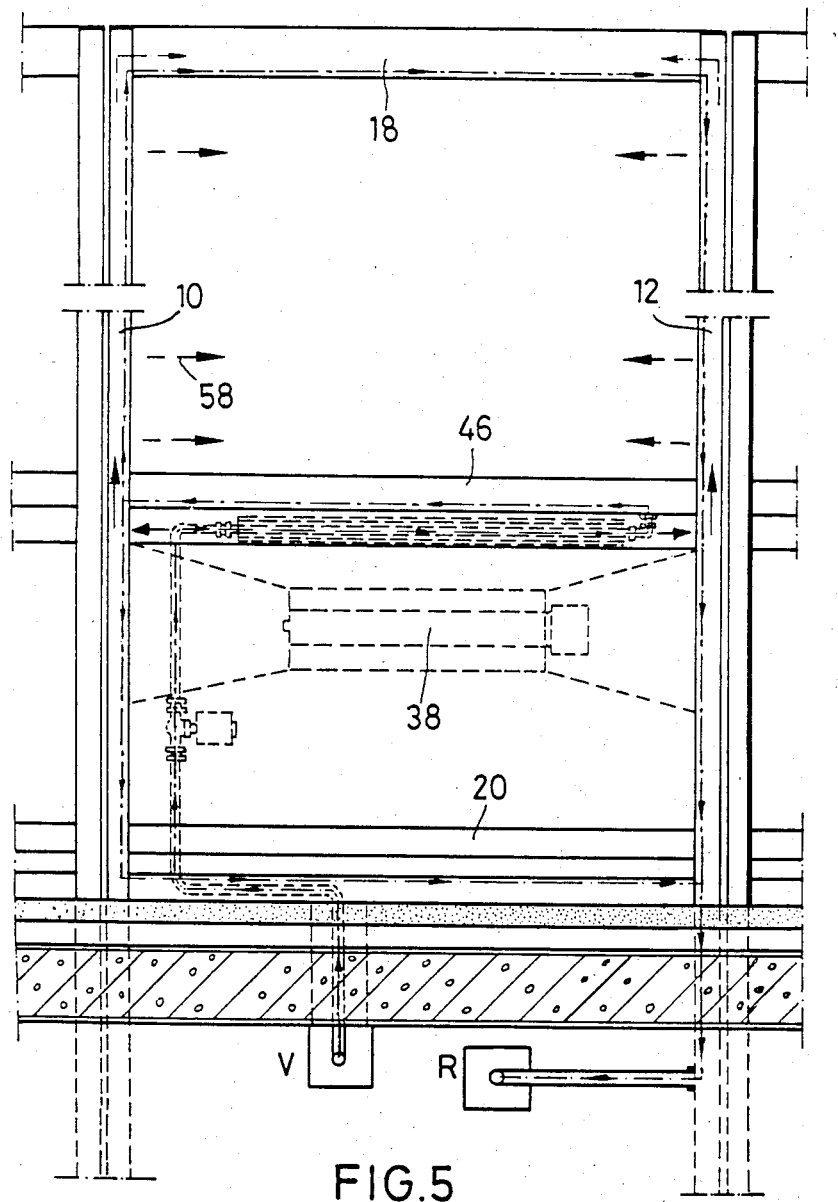
Figure 6:
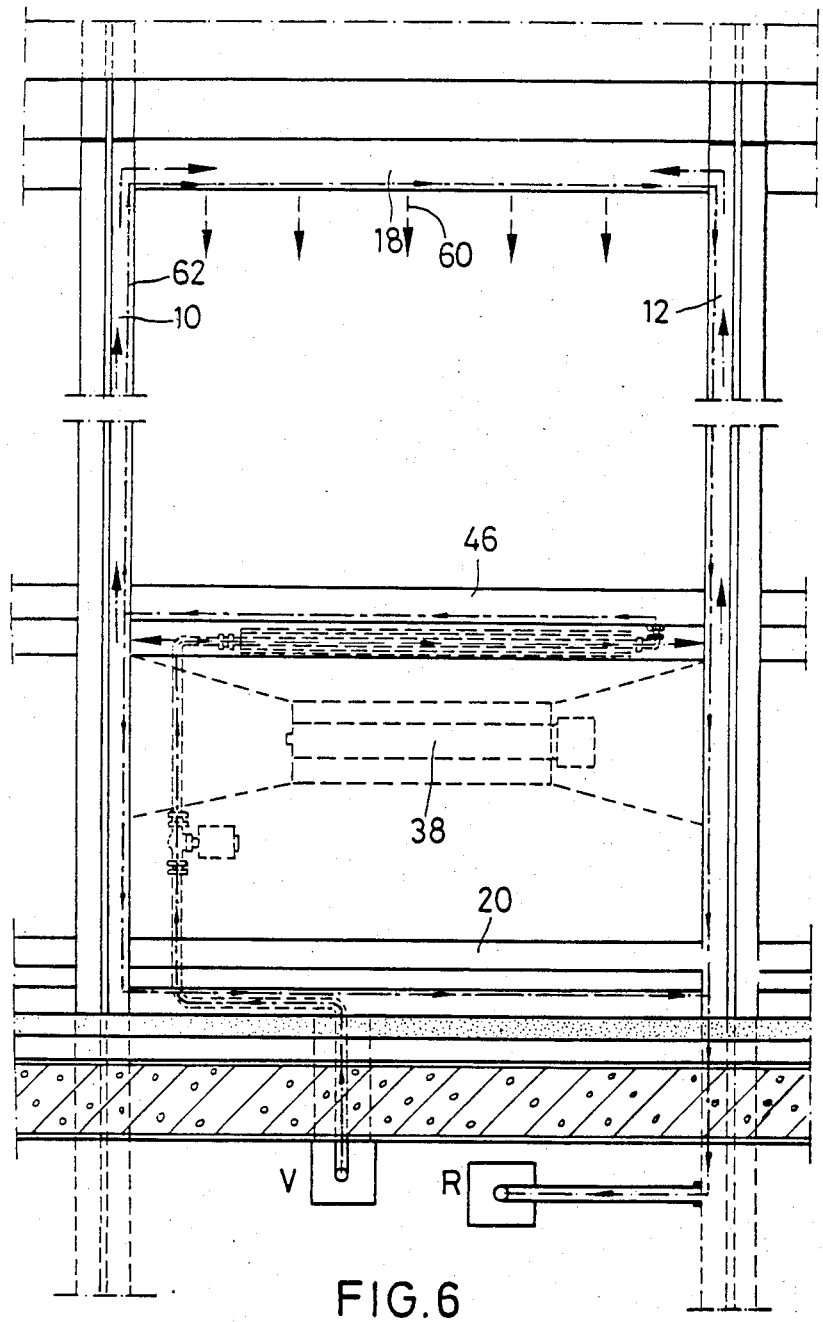

The air drawn from the room to be serviced and delivered upwardly from the blower 38 is pre-cooled or pre-warmed as it passes over the length of the star ribbed pipe 44 and into the railing crossbar 46 where its exposure to the portion of the latter providing the channel 48 subjects it to further heating or cooling influence. From this point the air can be arranged to emerge either at railing height, from the railing crossbar 46 (FIG. 4) or laterally from the facade posts 10, 12 (FIG. 5) or from the lintle or upper transverse crossbar 18 (FIG. 6). The facade uprights 10, 12, the railing crossbar 46 and the crossbar 18 are constructed to include air channels for this purpose. The facade posts 10 and 12 are provided with hollows for the air conduction in the zone of the connections of the transverse crossbar 18 and the railing 46. For the emergence of air there are provided in the railing crosspiece 46 outlet openings 50, in the hollow uprights outlet openings 52 and in the upper transverse crossbar outlet openings 54. The emerging air is indicated schematically in the drawings by arrows 56, 58 and 60. Note that inside the hollow uprights 10 and 12 and the upper transverse crossbar 18 there is arranged a channel 62 for the cooling or heating medium of the facade area to which they apply.

Figure 7:
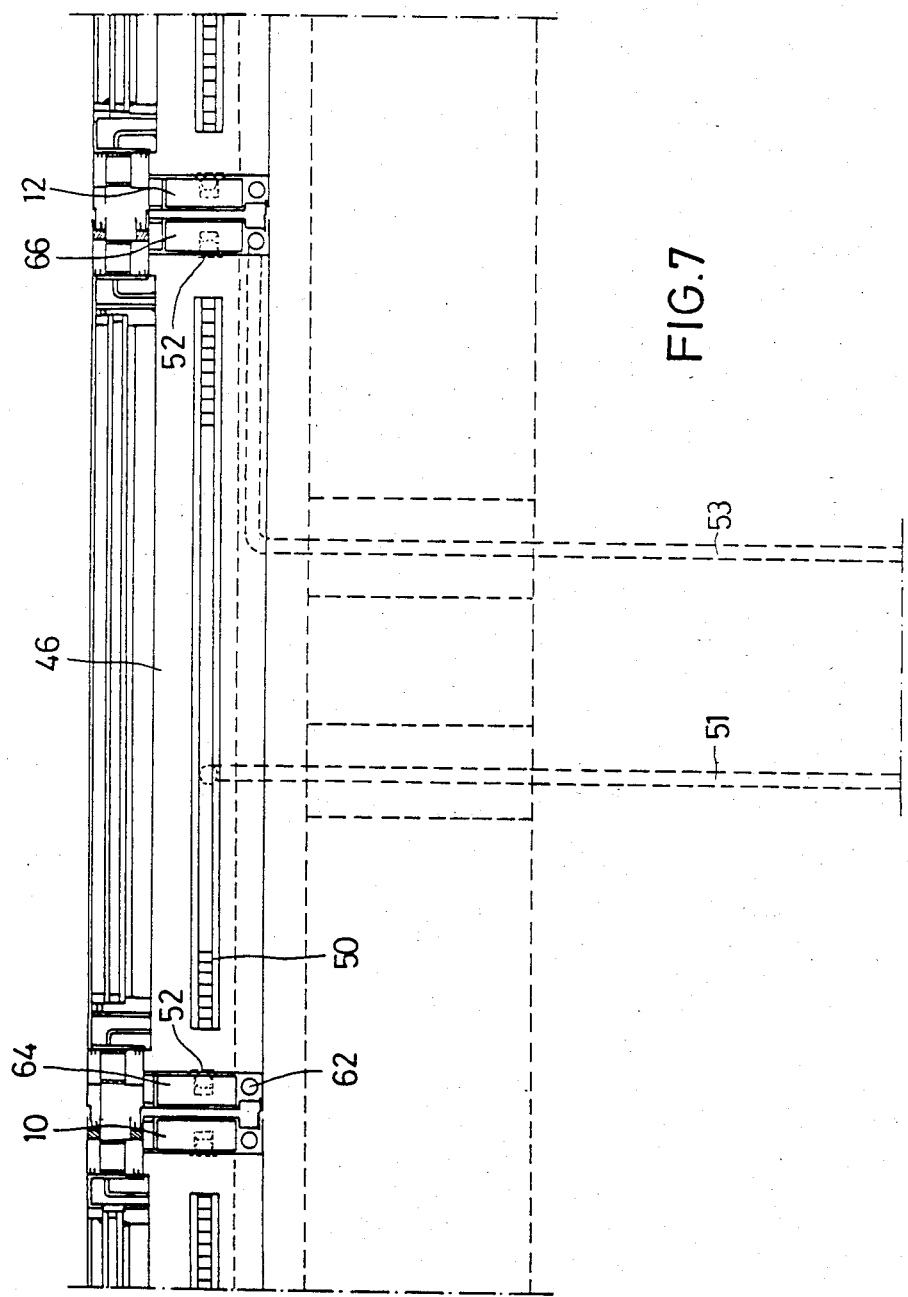
FIG. 7 shows a section along line VII—VII of FIG. 2.

FIG. 7 shows a section through the hollow uprights 10 and 12 and a plan view of the railing crossbar 46. The line 62 for the heating of the facade element which is provided in the uprights 10 and 12 may be seen in this figure as well as the channels 64 and 66 for the conduction of the pre-cooled or heated air which is drawn to and delivered by the cross-stream blower 38.

Figure 12:
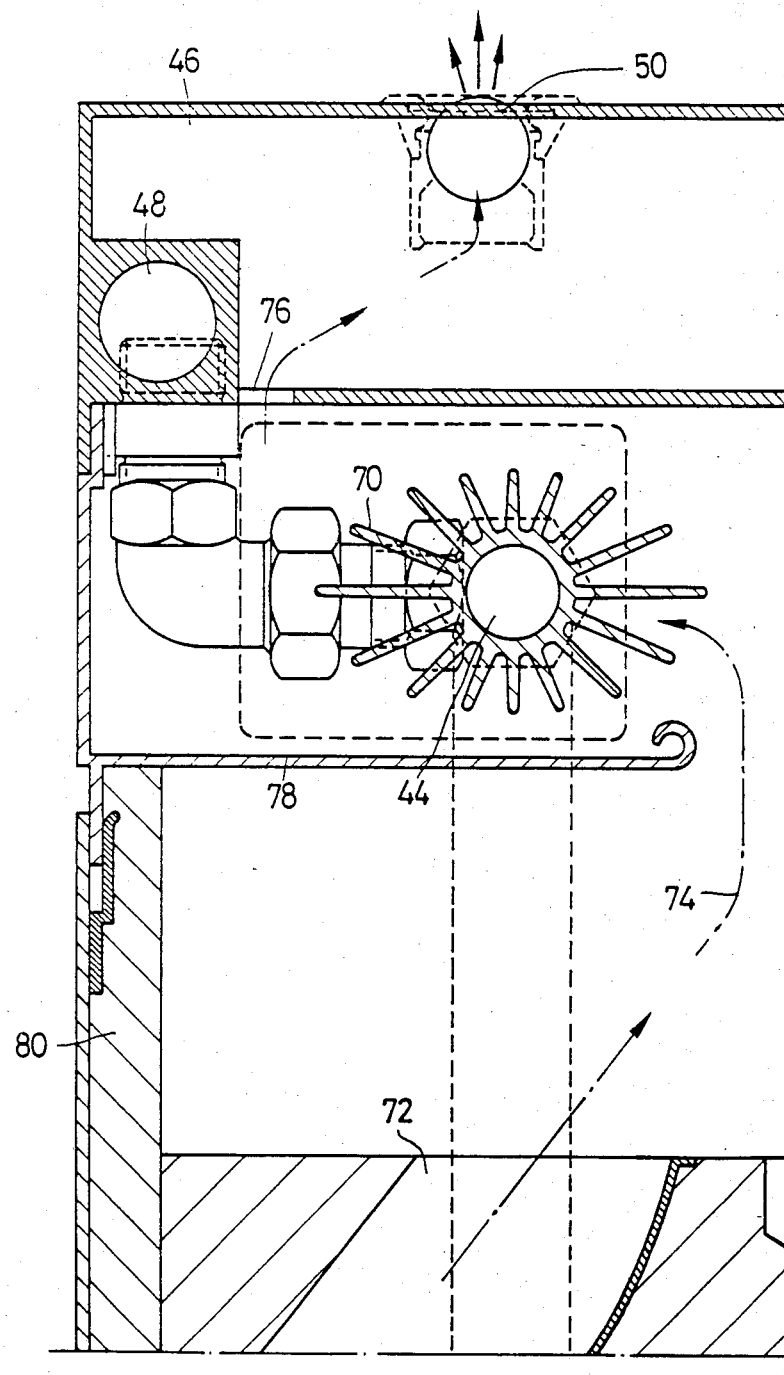
FIG. 12 shows, on an enlarged scale, parts of a vertical section corresponding to that of FIG. 3.

FIG. 12 shows an enlarged representation of a cross section through the star ribbed pipe 44. Through the ribs 70 which project from and radially of the pipe, forming a star pattern, there is achieved a substantial increase in the size of the exposed exterior surface of the pipe. As will be seen in FIG. 12, air flowing from the blower by way of the lead-off channel 72, indicated by the arrow 74, sweeps past the ribs 70 of the star ribbed pipe 44 and then passes through the opening 76 on the underside of the railing crossbar 46 either into the hollow uprights 10 and 12 and from there possibly into the transverse upper crossbar 18 or directly through the outlet openings 50 in front of the window area within the room and accordingly back into the room being serviced. Since the channel 48 in the railing 46 is likewise traversed by cooling or heating water, as noted previously, the air is further conditioned immediately of its return to the room from which air was originally extracted by the blower 38. A guide plate 78 provided relatively immediately of and underneath the star ribbed pipe 44 is so arranged to provide and assist to insure that the air 74 is actually guided over the ribs 70. A lining 80 arranged in front of the cross stream blower at the same time prevents an escape of the air over the cross stream blower before it has been conducted to and past the ribbed pipe 44 and assures that the entire air which is directed and drawn to the cross stream blower passes through the filter in advance thereof.

Figure 8:
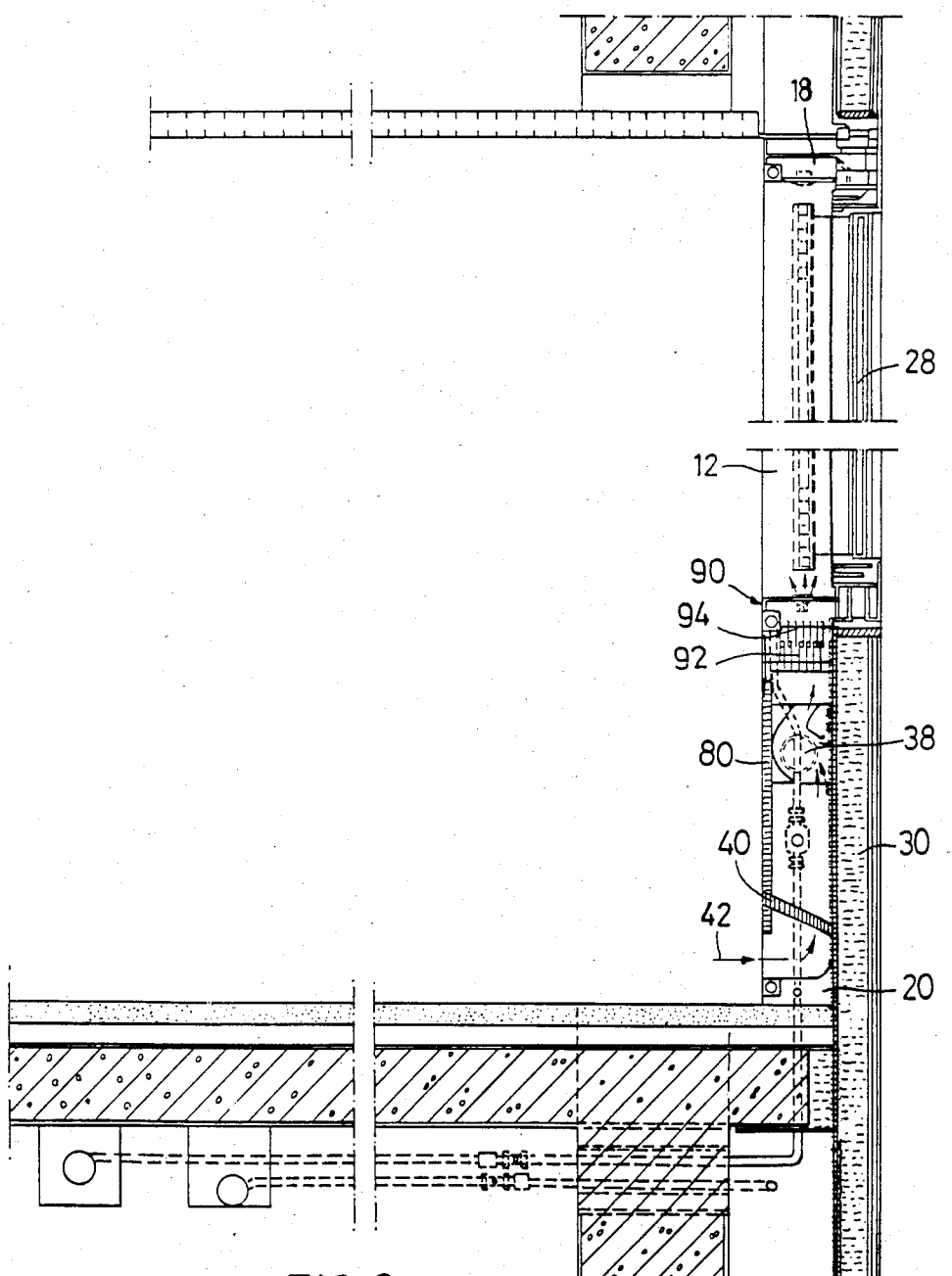
FIG. 8 shows a vertical section similar to that of FIG. 3 but exhibiting a different form of execution of the invention.
Figure 9:
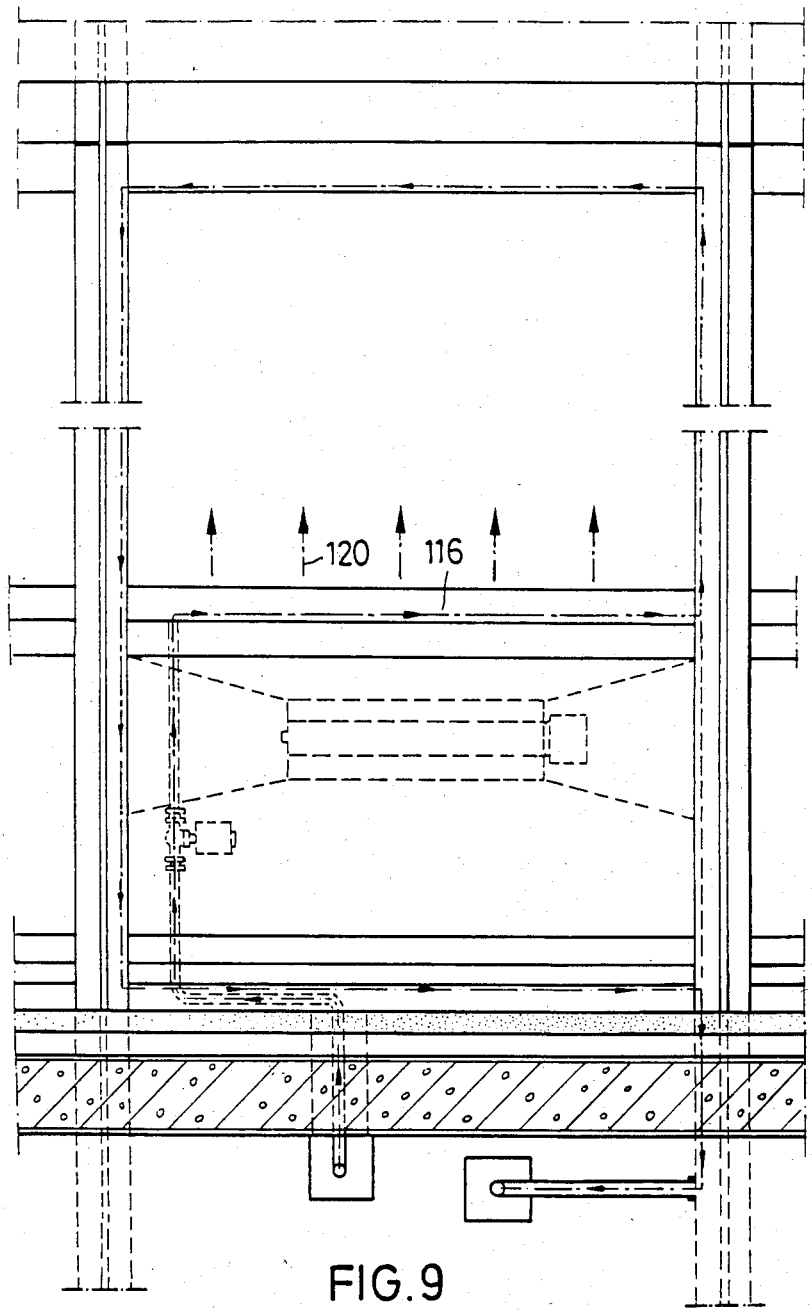
FIGS. 9-11 show representations of the nature shown in FIGS. 4-6 but in this case with reference to the form of execution of the invention represented in FIG. 8.
Figure 10:
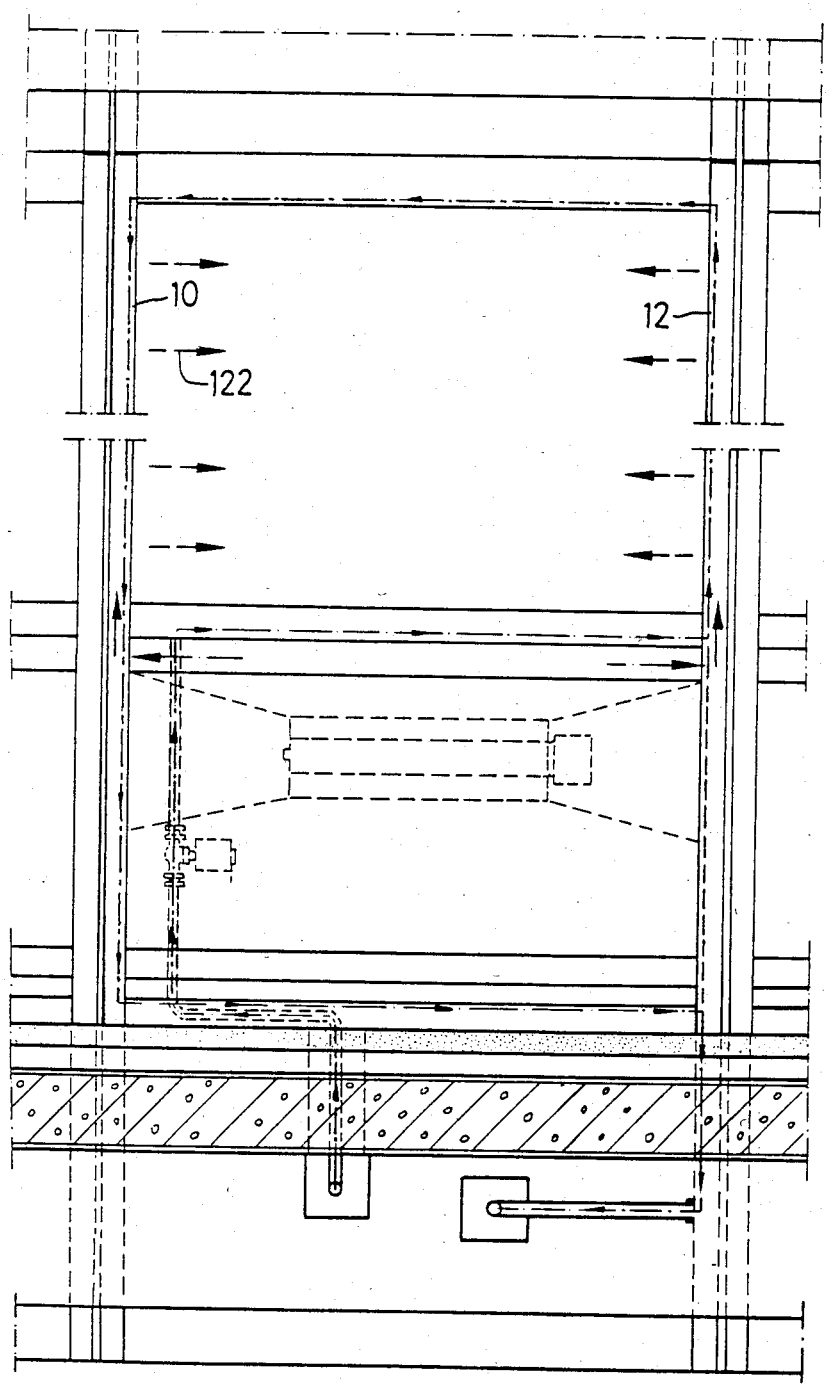
Figure 11:
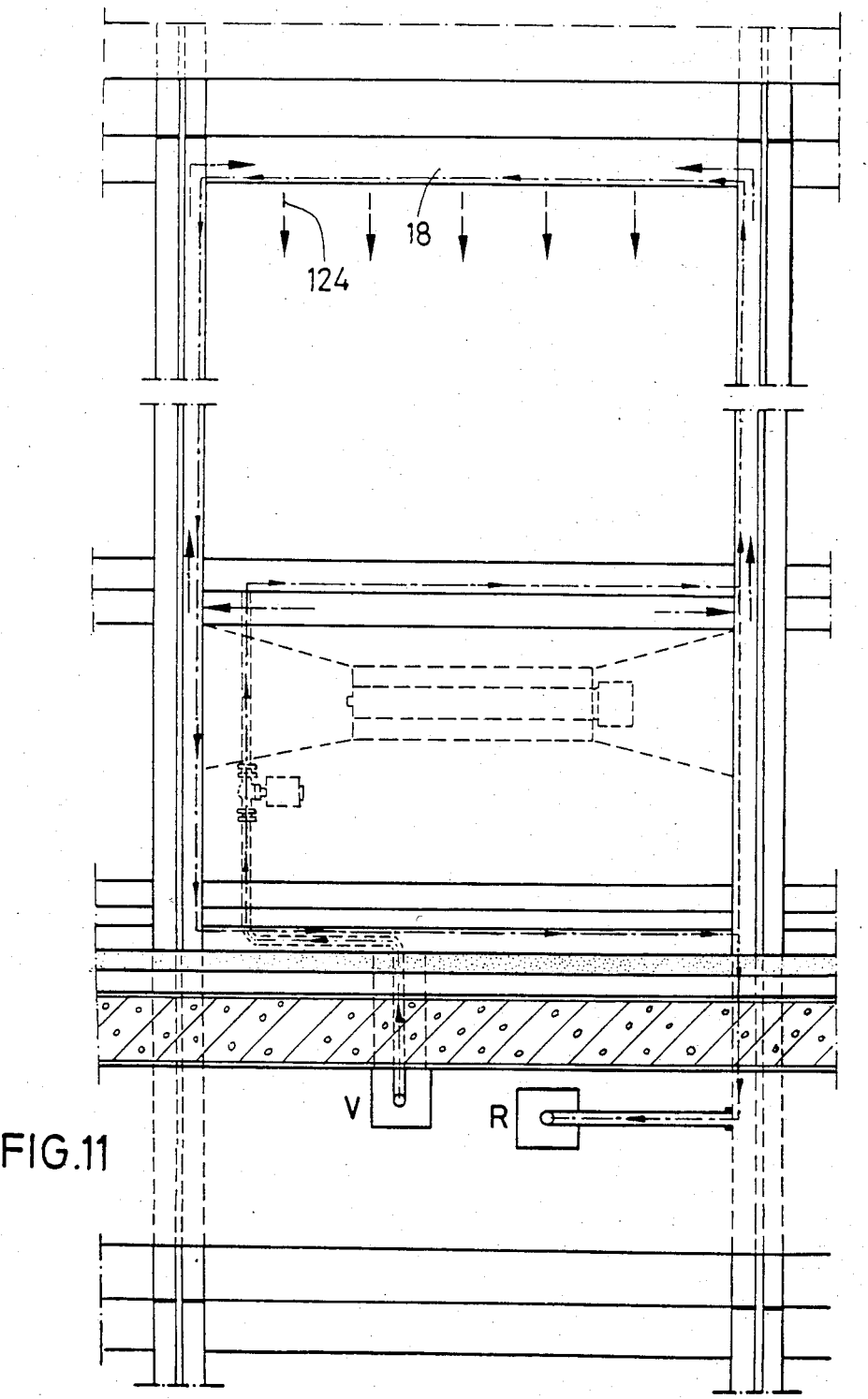
Figure 13:
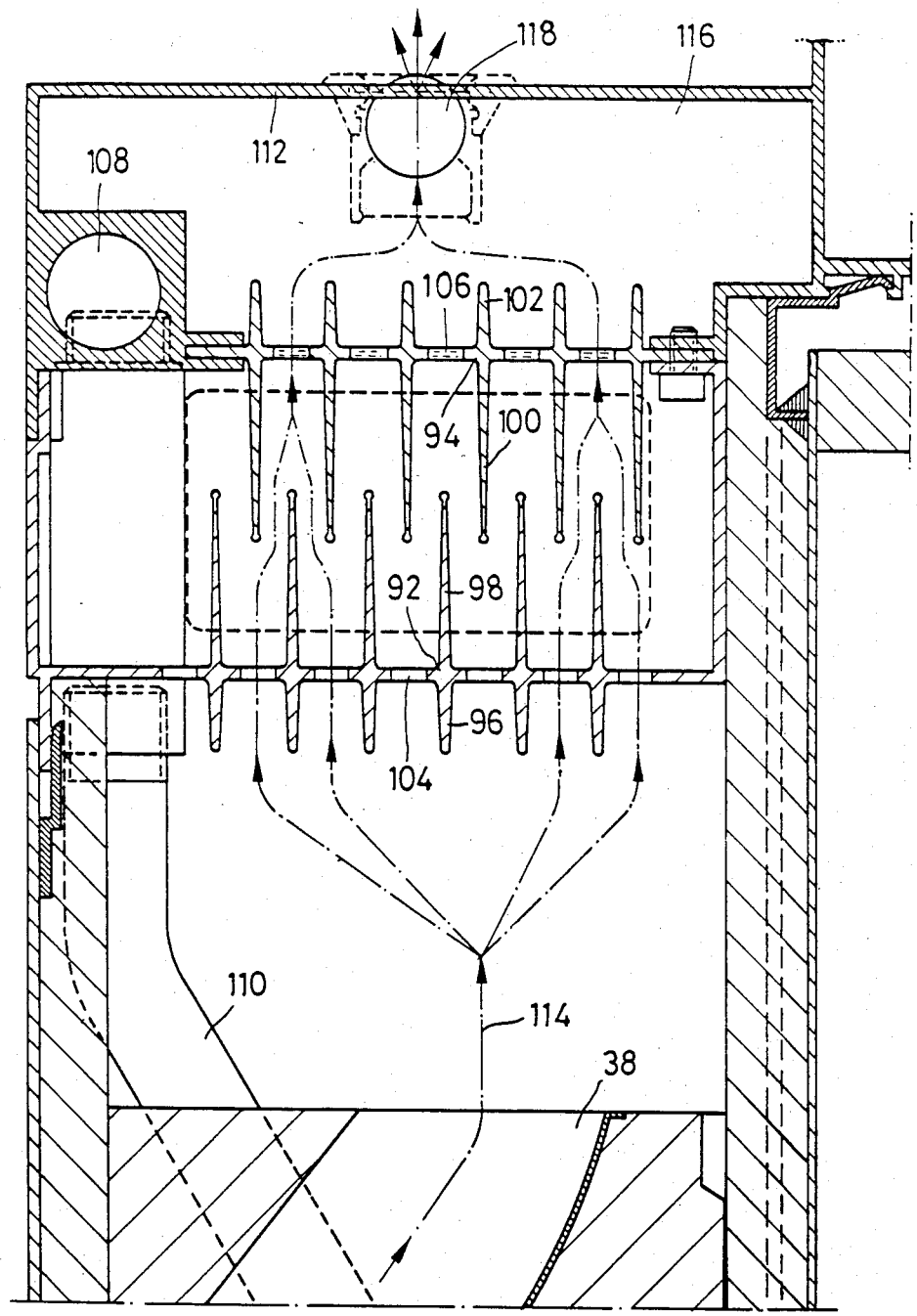
FIG. 13 shows, on an enlarged scale, parts of a vertical section corresponding to that of FIG. 8.

FIG. 8 shows a section of a facade analogous to that illustrated in FIG. 3 and exhibiting similar construction with exception that instead of a star ribbed pipe there is provided a railing crossbar 90 composed of three parts. Noting FIG. 13 in conjunction with FIG. 8, it may be seen that this railing crossbar 90, formed for example of aluminum, presents two parts 92, 94 in profile which embody pressed on laminations, part 92 being provided with the laminations 96 and 98 and part 94 with the laminations 100 and 102. The laminations 98 and 100 are arranged to intermesh in the manner of a comb. Between the laminations there are formed in the lower profile 92 passage openings 104 and in the upper profile 94 passage openings 106. These passage openings can be circular or in slit form. The third railing crossbar is provided on the upper side and has a channel 108 for the cooling or heating medium. The feed to this channel occurs over a line 110. The railing crossbar profile parts 92, 94 and 112 are cooled and heated, respectively, by the cooling or heating fluid flowing through the channel 108. The laminations formed on the profile parts 92 and 94 and in particular the laminations 98 and 100 intermeshing in comb fashion yield a large effective surface. As seen in FIG. 13, the air 114 fed in through the cross-stream blower 38 flows therefrom through the openings 104 in the lower profile part 92 past the laminations 96 and 98, in order then to be constricted by the laminations 100 in its path before it passes through the openings 106 into the upper railing crossbar passage 116. From there, the air can be conducted either through channels into the hollow uprights on into the bridging crossbar, in order to emerge from the hollow uprights or from above out of the crossbar 18. The cooled or heated air can, however, also be given off to the room directly through openings 118 in the railing crossbar. FIG. 9 shows the form of execution according to FIGS. 8 and 13 with the three-part railing crossbar in which the air 120 emerges from the railing crossbar 116. In the form of execution shown in FIG. 10 the air 122 escapes laterally from the hollow uprights 10 and 12, and in the form of execution shown in FIG. 11 air 124 emerges above from the transverse crossbar 18 into the room.

For each facade element, consisting, for example, of two hollow uprights, an upper transverse crossbar, a railing crossbar, a lower transverse crossbar, a window area and a panel there are provided a regulating valve 130, a temperature sensor with regulator 132 and a switch-over relay 134 for switch-over from hot to cold water. In this two conductor system that is shiftable over to hold hot or cold water, the regulation occurs in the first sequence as regulation of the performance of the integrated facade and in the second sequence through switching-on of the cross-stream fan. For the hot water system an overflow valve is necessary.

If with such a facade in the summer months during the cooling period the room air temperature is to be maintained at about 26° C., and if the cooling water entry temperature at 17° C. is taken as a basis and the cooling water emergence temperature can take on 19° C., the mean cooling water temperature amounts to about 18° C. With the dew point of 17° C. there corresponds then a room air humidity of 65% and 55% at a room air temperature between 24° to 26° C. So that the dew point will not be gone below, a special sensor monitors the cooling water entry temperature. In order to maintain a room temperature of about 26° C. with an outside temperature of about 32° C., there is required an air circulation amount of about 62 to 68 m$^3$ per hour per cross-stream fan.

Figure 14:
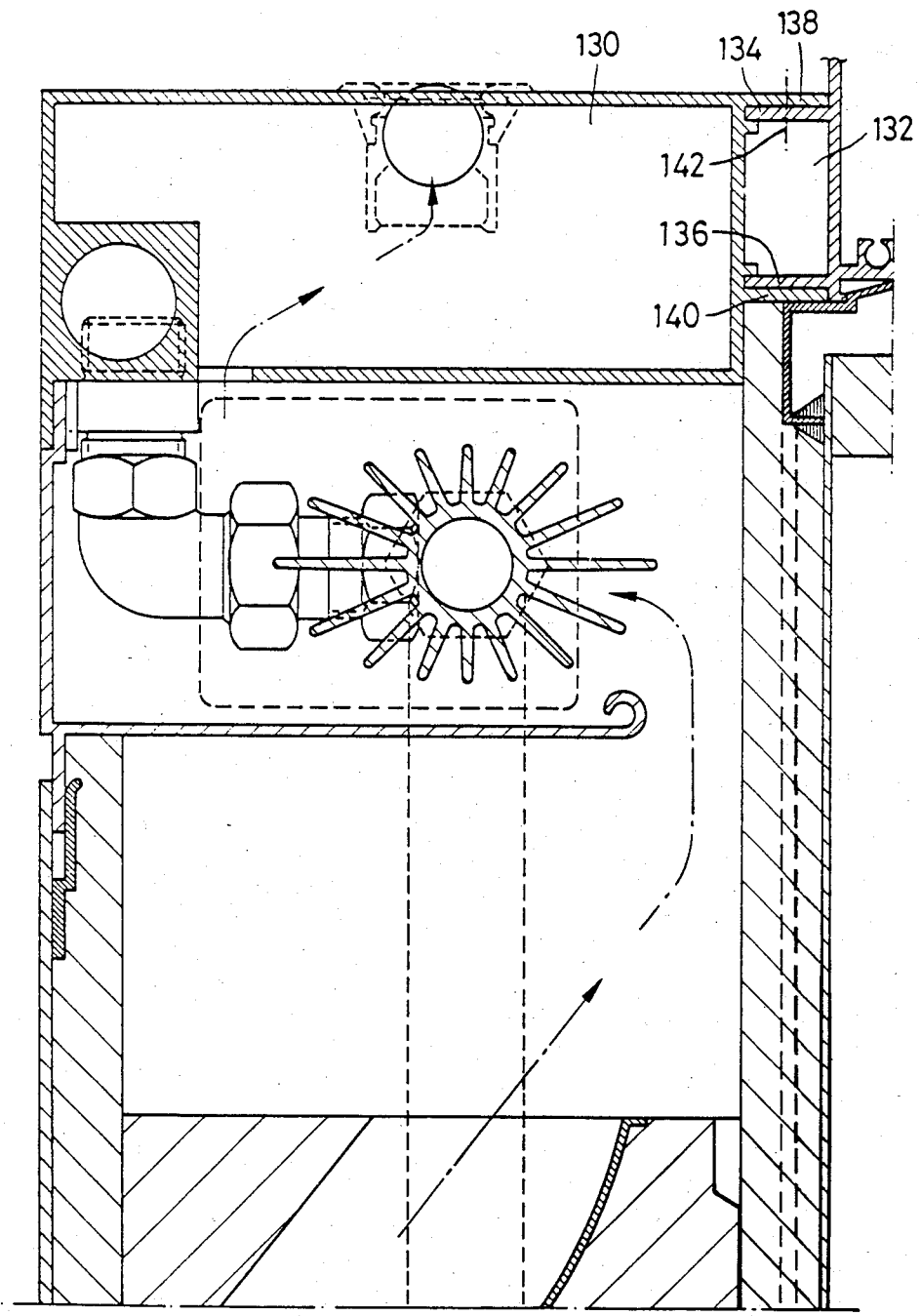
FIG. 14, shows a vertical section analogous to that exhibited in FIG. 12 but with modifications included therein.

FIG. 14 shows a representation analogous to FIG. 12. The formation of the star ribbed pipe and of the air conduction corresponds to that shown in FIG. 12, so that it is not necessary to go into detail about this. As compared to the form of execution shown in FIG. 12, however, there is not provided any railing crossbar constructed in one piece. Here the railing crossbar is divided into an inner part 130 and an outer part 132, in which arrangement the inner part 130 is thrust onto the outer part 132 and screwed in place. For this shanks 134 and 136 are provided on the part 132 which come on the inside of shanks 138 and 140 on the part 130 into engagement therewith. Through releasing a screw connection 142 which interconnects these parts it is possible to remove the railing crossbar part 130 so that possible leaks can be obviated or corrected. The shanks 134 and 136 can be pressed on the railing crossbar part 132, but they can also be screwed on, so that subsequently a railing crossbar part 130 can be mounted.

Figure 15:
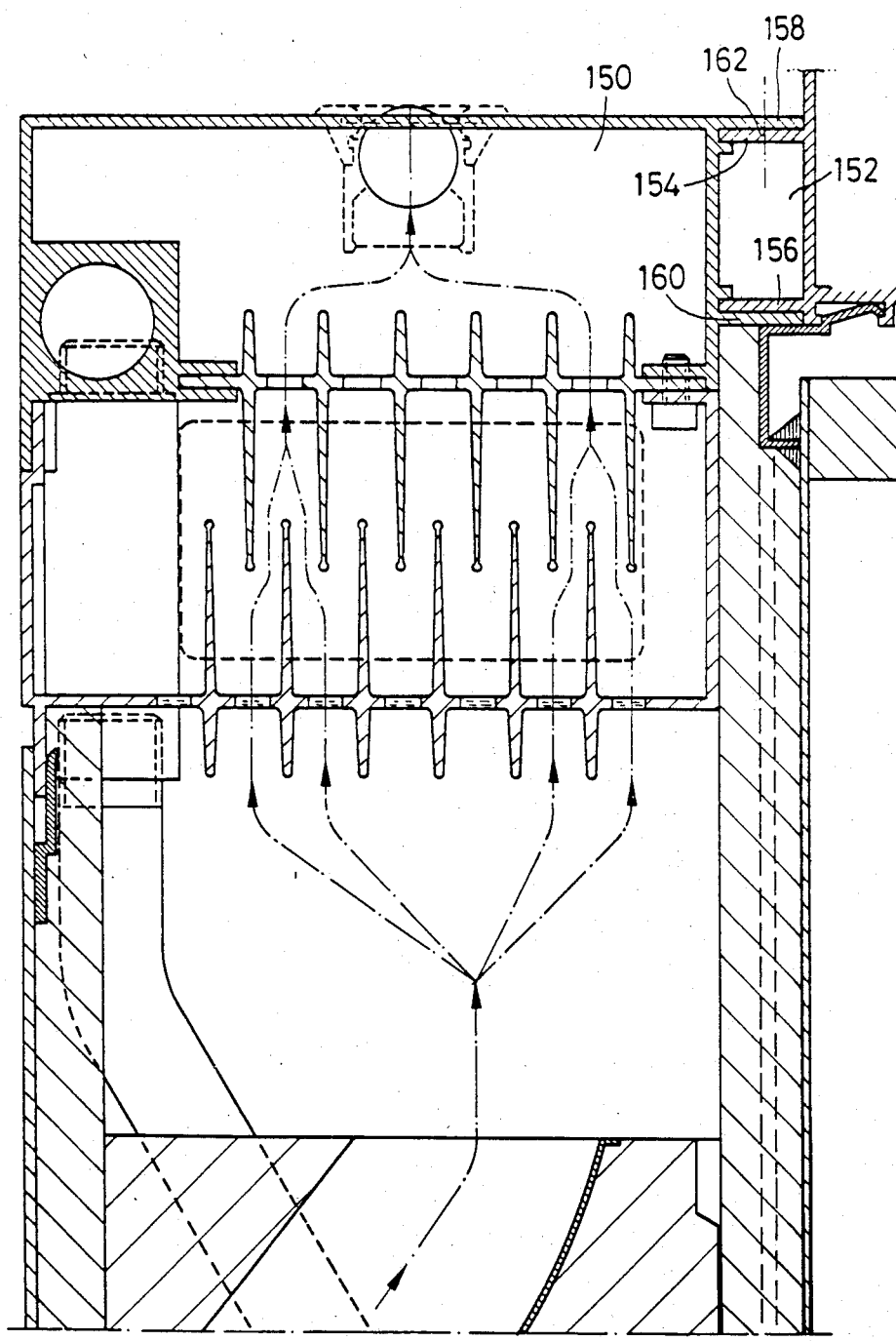
FIG. 15 shows a vertical section analogous to that of FIG. 13 but exhibiting modifications therein.

The railing crossbar shown in FIG. 15 consists of an inner part 150 and an outer facade crossbar 152. On the railing crossbar 152 there are pressed or screwed shanks 154 and 156, which serve as support for shanks 158 and 160 that are molded on the railing crossbar part 150. The parts 150 and 152 are joined by a releasable screw 162, so that the part 150 can be installed subsequently or can be removed for repairs from the facade crossbar 152.

Figure 16:
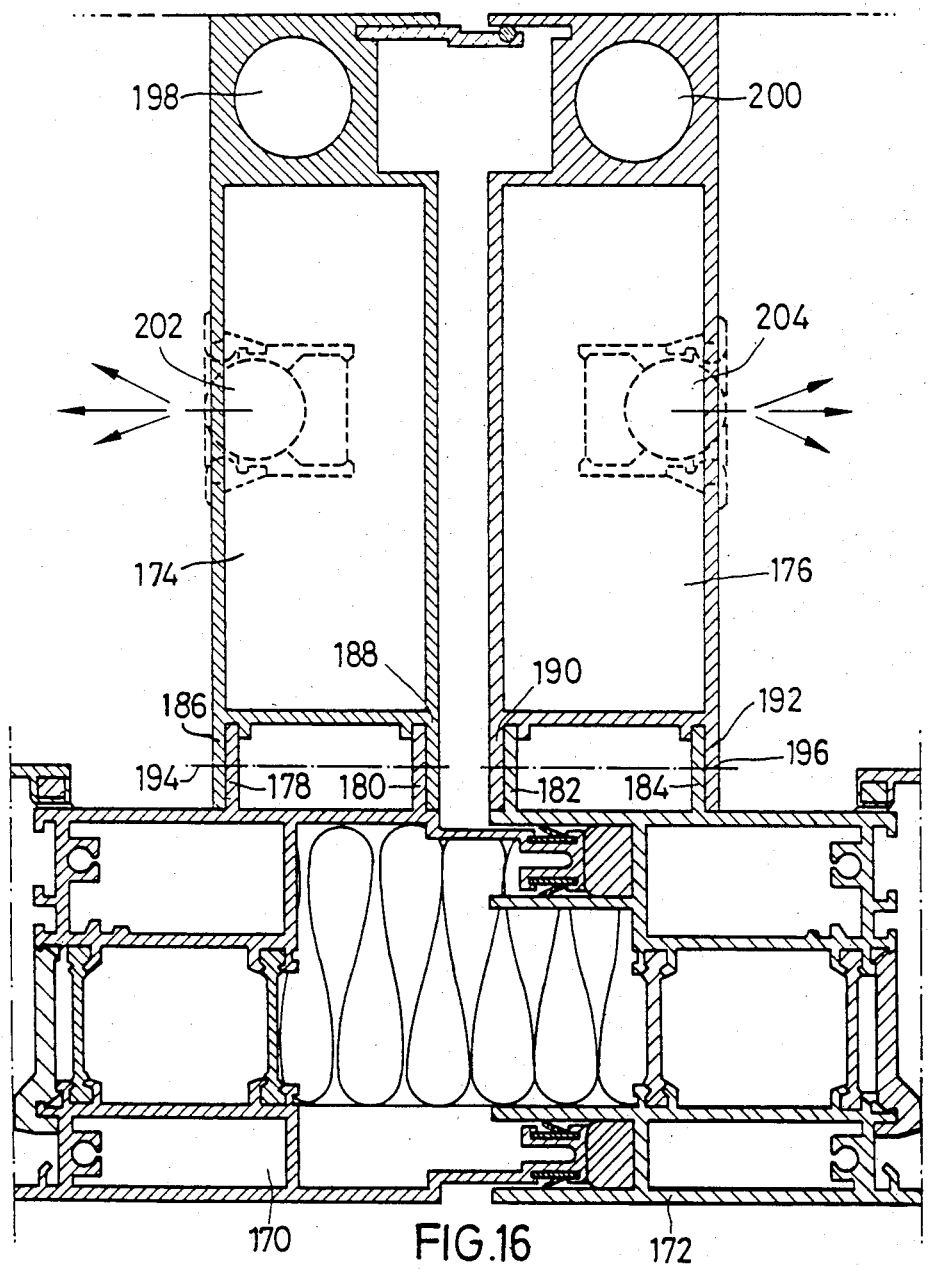
FIG. 16 shows a horizontal section through a facade upright with pipe frame register set in front and to the side thereof innermost of the building.

On the facade uprights 170 and 172 shown in FIG. 16 there are arranged vertical elements 174 and 176 of a pipe frame register. For this on the upright 170 there are pressed or screwed shanks 178 and 180 and on the upright 172 shanks 182 and 184. These shanks serve for the support of shanks 186 and 188 which are molded on the vertical element 174, and of shanks 190 and 192 that are molded on the vertical element 176.

The connection of the vertical element 174 with the upright 170 occurs by means of a screw joint 194 and the corresponding connection of the vertical element 176 with the upright 172 occurs by means of a screw joint 196. In the vertical elements 174 and 176 there are provided channels 198 and 200 for the heating or cooling water and channels 202 and 204 for the air conveyed through the cross-stream blower. Channels 202 and 204 are formed with corresponding outlet openings for the air. Also the vertical elements 174 and 176 can be mounted subsequently on the uprights 170 and 172 and they can be removed from the uprights in order to carry out possible repairs or alterations.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or priviledge is claimed are defined as follows:

1. Apparatus for conditioning the environment within a room or room area of a building bounded by a facade wall or walls thereof including means defining a function field of said apparatus comprising, with reference to a floor level of said room or room area to which it applies, and in a wall portion thereof, at least one pair of laterally spaced hollow uprights interconnected with and bridged by a plurality of hollow cross bars which are vertically spaced and include upper, lower and intermediately positioned cross bars, an intermediate of said cross bars being a railing cross bar which bounds one limit of the vertical extent of a railing zone of said function field the opposite limit of which is defined by another of said cross bars and the lateral limits of which are defined by portions of said one pair of uprights, said hollow uprights and cross bars defining a framework including therein means defining a flow path interconnected with means extending through said railing zone for delivering thereto and inducing the passage therethrough of a flow of hot or cold liquid, as needs require, means in connection with and within the railing zone of said framework including a cross stream blower defining a passage for movement of air from an inlet thereto, which is upstream of said blower and communicates with the interior of said room or room area the environment of which must be conditioned, to an interior portion of said railing cross bar, said cross stream blower, when energized, being operative to draw air from said room or room area through said inlet and deliver it to and through said railing zone and to and from said railing cross bar in the process of which to inherently subject said air to the influence of said hot or cold liquid and means providing for discharge of said air so conditioned by way of openings from one or more of said hollow uprights and vertically spaced cross bars directly back to said room or room area from which said air was originally drawn, thereby to provide a simple, complete and highly effective system for conditioning the environment thereof.

2. Apparatus according to claim 1 characterized in that said means extending through said railing zone for delivering thereto and inducing the passage therethrough of a flow of hot or cold liquid incorporates therein a pipe having a multiplicity of closely and circumferentially spaced outwardly projected ribs which extend substantially the length thereof, said pipe being positioned intermediate said cross stream blower and said railing cross bar, in the path of air flowing to said railing cross bar from said room or room area the environment which is required to be conditioned.

3. Device according to claim 1, characterized in that over the cross-stream blower there is arranged a multipart railing crossbar, that two parts of the railing crossbar are formed with laminations and that the lamination profiles are provided with passage openings.

4. Device according to claim 3, characterized in that portions of the laminations intermesh like a comb.

5. Device according to claim 3, characterized in that the passage openings are constructed as passage bores or elongated slits.

6. Device according to claim 4, characterized in that the passage openings are constructed as passage bores or elongated slits.

7. Device according to claim 3, characterized in that in the railing crossbar there are provided air channels without outlet slits.

8. Device according to claim 4, characterized in that in the railing crossbar there are provided air channels without outlet slits.

9. Device according to claim 4, characterized in that in the facade uprights there are provided air channels with outlet slits.

10. Device according to claim 1, characterized in that in the zone of the crossbar connections there are provided recesses for the air conduction.

11. Device according to claim 9, characterized in that in the zone of the crossbar connections there are provided recesses for the air conduction.

12. Apparatus as in claim 1 characterized in that portions of said hollow uprights and cross bars of said function field frame a window area thereof bounded in part by said railing cross bar and said means providing for discharge of said conditioned air by way of said openings from one or more of said hollow uprights and vertically spaced cross bars are so arranged as to initially direct said air, in the return thereof, across said window area.

13. Apparatus as in claim 12 characterized in that said railing zone is in a lower part of said function field and said window area is substantially immediately above said railing cross bar.

14. Apparatus as in claim 1 wherein said means defining a flow path interconnected with means extending through said railing zone for delivering thereto and therethrough a flow of hot or cold liquid are provided by means defining a channel in connection with the extending lengthwise and forming part of the walls of said hollow uprights and cross bars.

15. Apparatus according to claim 1 characterized in that said railing cross bar is comprised of a plurality of parts including an inner wall portion thereof formed with laminations which project from surface portions thereof and said inner wall portion includes passage openings between adjacent of said laminations through which said cross stream blower delivers air for further conditioning of the temperature thereof and passage thereof back to the roon or room area from which said air has been drawn.

16. Apparatus as in claim 15 characterized by a further part of said railing cross bar formed with laminations which project from surface portions thereof and passage openings between adjacent of said laminations through which said cross stream blower delivers air for further conditioning of the temperature thereof and passage thereof back to the roon or room area from which said air has been drawn is positioned upstream of and in spaced relation to said inner wall portion of said railing cross bar and projected portions of the laminations thereof respectively intermesh with and position in adjacent spaced relation to projected portions of the laminations on said inner wall portion of said railing cross bar.

17. Apparatus as in claim 12 wherein at least portions of said hollow uprights and said cross bars which bound said window area have air flow passages defined therein, the length thereof, which are intercommunicated to facilitate the use of a selective discharge area or areas of said framewaork through which air, once the temperature thereof has been conditioned, may be returned to the room from which it has been withdrawn.

18. Apparatus as in claim 1 wherein filtering means are provided in said passage for movement of air from an inlet thereto which communicates with the interior of said room or room area the environment of which must be conditioned and said filtering means is provided upstream of said cross stream blower.

19. Apparatus according to claim 1 characterized in that there is a regulating valve, a temperature sensor with regulator and a relay associated with said function field which are constructed and arranged to control the temperature of said liquid, to switch over from hot to cold liquid as needs require to obtain the desired range of temperature of the air which is returned to the room or room area from which it has been withdrawn in the first instance.

20. Apparatus as in claim 1 characterized in that the vertical extent of said framework comprised of said horizontal uprights and interconnected cross bars run from a floor level substantially to the ceiling of the room or room area being serviced by said apparatus.

21. Apparatus as in claim 12 wherein there are a series of said means comprising function fields arranged in side by side relation defined by a series of succesively adjacent of said hollow uprights, adjacent of which are paired and laterally spaced and bridged by vertically spaced hollow cross bars, interconnected therewith and inclusive of upper, lower and intermediately positioned cross bars.

22. Apparatus as in claim 1 characterized in that said cross stream blower is constructed and arranged to produce a circulation of air in amounts in the range of 50 to 100 m³ per hour.

23. Apparatus for conditioning the environment within a room or room area of a building bounded by a facade wall or walls thereof including means defining a function field of said apparatus comprising, with reference to a floor level of said room or room area to which it applies, and in a wall portion thereof, at least one pair of laterally spaced hollow uprights interconnected with and bridged by a plurality of hollow cross bars which are vertically spaced and include upper, lower and intermediately positioned cross bars, an intermediate of said cross bars being a railing cross bar which bounds the upper limit of the vertical extent of a railing zone of said function field, the opposite limit of which is defined by another of said cross bars and the lateral limits of which are defined by portions of said one pair of uprights, a cross stream blower within said railing zone, pipe-like means having in connection therewith a line for the delivery thereto and therethrough of hot or cold fluid, as needs require, said pipe-like means being downstream of said blower, in advance of and in adjacent relation to said railing cross bar, said pipe-like means orienting transverse to portions of said hollow uprights which laterally bound said railing zone and being connected to direct liquid received thereby through means defining a channel in connection with and generally lengthwise of said railing cross bar, means defining an inlet to said railing zone which is in direct communication with the environment of the room or room area bounded by said wall portion thereof, said cross stream blower, when energized, being operative to draw air from said room or room area through said inlet and direct it to and through said railing zone, means for directing said air from said blower in a controlled path to cause it to move over substantially the entire surface of said pipe-like means and into said railing cross bar in the process of which to inherently subject said air to the influence of said hot or cold fluid in said pipe-like means and said channel and means providing for discharge of said air from said railing cross bar, so conditioned, by way of openings from one or more of said hollow uprights and vertically spaced cross bars, directly back to said room area or room from which said air was originally drawn, thereby to provide a complete system for conditioning the environment thereof.

24. Apparatus as in claim 23 characterized in that portions of said hollow uprights and cross bars of said function field frame a window area thereof and air directed back to said room or room area through said openings from one or more of said hollow uprights and vertically spaced cross bars is, by virtue of means defining said openings, directed, at least in part, across said window area.

25. Apparatus as in claim 23 characterized in that said pipe-like means has a multiplicity of closely and circumferentially spaced ribs which project outwardly therefom and extend substantially the length thereof and said means defining a channel in connection with and generally lengthwise of said railing cross bar is formed in and part of the wall of said railing cross bar.

26. Apparatus as in claim 25 characterized in that guide means are interposed between said blower and said pipe-like means and the interior of said railing cross bar and said guide means are constructed and arranged to define a restricted portion of said railing zone immediately of said railing cross bar and a restricted path for flow of air from said blower which directs said air to move to one side of and then across and about said pipe-like means to the interior of said railing cross bar at the upper limit of said railing zone.

27. Apparatus as in claim 26 wherein said restricted flow path opens to the interior of said railing cross bar adjacent and along the length of said means defining said channel whereby to provide that the air passing therethrough from said blower is influenced as to its temperature level first in its movement over and about said pipe-like means and secondly in passing over said means defining said channel in its entry to and within said railing cross bar.

28. Apparatus as in claim 24 wherein portions of said hollow uprights and cross bars are formed to define therein interconnecting pasages through which air drawn from said room or room area and delivered thereto by said blower is passed prior to the return thereof and said railing cross bar and said hollow uprights and other of said cross bars include means which define therein a continuing channel for flow thereto, therein and therefrom of said hot or cold liquid which serves to continue the conditioning of such air as is passed therethrough.

* * * * *